United States Patent
Kakimoto et al.

(10) Patent No.: US 7,308,245 B2
(45) Date of Patent: Dec. 11, 2007

(54) MOBILE STATION

(75) Inventors: Yoichi Kakimoto, Osaka (JP);
Masahiro Izaki, Osaka (JP);
Masayoshi Masuda, Osaka (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 0 days.

(21) Appl. No.: 10/568,876

(22) PCT Filed: Aug. 26, 2004

(86) PCT No.: PCT/JP2004/012664

§ 371 (c)(1),
(2), (4) Date: Oct. 5, 2006

(87) PCT Pub. No.: WO2005/022780

PCT Pub. Date: Oct. 3, 2005

(65) Prior Publication Data

US 2007/0042814 A1 Feb. 22, 2007

(30) Foreign Application Priority Data

Aug. 28, 2003 (JP) .............................. 2003-304831

(51) Int. Cl.
*H04B 1/16* (2006.01)

(52) U.S. Cl. .................. 455/343.4; 455/574; 455/231; 370/311

(58) Field of Classification Search ................ 455/230, 455/231, 343.1, 343.2, 343.3, 343.4, 343.5, 455/574; 370/311
See application file for complete search history.

(56) References Cited

U.S. PATENT DOCUMENTS

| 5,301,225 | A | | 4/1994 | Suzuki et al. |
| 6,119,010 | A | * | 9/2000 | Labedz ...................... 455/446 |
| 2002/0173325 | A1 | | 11/2002 | Rosen et al. |
| 2002/0177461 | A1 | | 11/2002 | Rosen et al. |
| 2004/0176145 | A1 | * | 9/2004 | Lee et al. .................... 455/572 |
| 2004/0218555 | A1 | * | 11/2004 | Chen et al. ................. 370/311 |

FOREIGN PATENT DOCUMENTS

| JP | 5-183487 | 7/1993 |
| JP | 07-050627 | 2/1995 |
| JP | 7-123045 | 5/1995 |
| JP | 09-312602 | 12/1997 |
| JP | 9-331288 | 12/1997 |
| JP | 2000-022613 | 1/2000 |
| JP | 2000-209145 | 7/2000 |
| JP | 2001-156689 | 6/2001 |
| JP | 2003-87180 | 3/2003 |
| WO | WO 02/093778 A1 | 11/2002 |
| WO | WO 02/093948 A1 | 11/2002 |

* cited by examiner

*Primary Examiner*—Thanh Le
*Assistant Examiner*—Christian A. Hannon
(74) *Attorney, Agent, or Firm*—Kratz, Quintos & Hanson, LLP (57) ABSTRACT

Provided is a mobile station that a user is able to use without inconvenience, and that is able to realize power consumption saving. The mobile station: records a speech-communication history including information identifying a time at which speech communication occurred; decides a cycle changing time and a cycle-after-change based on the speech-communication history, the cycle changing time being a time at which a paging channel monitoring cycle used by a base station in message transmission is to be changed, and the cycle-after-change being a cycle at which the paging channel is to be monitored after the change; notifies the base station of a slot cycle index indicating the decided cycle-after-change when the decided cycle changing time has come; and starts monitoring the paging channel at the decided cycle-after-change when the decided cycle changing time has come.

7 Claims, 7 Drawing Sheets

| | 310 | 320 | 330 | 340 | 300 |
|---|---|---|---|---|---|
| | DATE | TIME PERIOD | PTT MODE | SPEECH-COMMUNICATION NUMBER OF TIMES | |
| | 8/1 | 0:00-3:00 | OFF | — | |
| | | 3:00-6:00 | OFF | — | |
| | | 6:00-9:00 | OFF | — | |
| | | 9:00-12:00 | ON | 10 | |
| | | 12:00-15:00 | ON | 0 | |
| | | 15:00-18:00 | ON | 30 | |
| | | 18:00-21:00 | ON | 0 | |
| | | 21:00-24:00 | OFF | — | |
| | 8/2 | 0:00-3:00 | OFF | — | |
| | | 3:00-6:00 | OFF | — | |
| | | 6:00-9:00 | ON | 5 | |
| | | 9:00-12:00 | ON | 0 | |
| | | 12:00-15:00 | | | |
| | | 15:00-18:00 | | | |
| | | 18:00-21:00 | | | |
| | | 21:00-24:00 | | | |

MOBILE STATION

TECHNICAL FIELD

The present invention relates to a mobile station that monitors, using a paging channel, calls and the like issued from a base station during a standby state. The present invention particularly relates to a power saving technology for such a mobile station during a standby state.

BACKGROUND ART

Conventionally, in CDMA (Code Division Multiple Access) communication and the like, a mobile station saves power consumption by bringing unnecessary circuits thereof to a low power consumption mode. In more detail, a mobile station adopts an intermittent reception method by which, in the standby state waiting for a call from the base station, only paging channel slots assigned to the mobile station are monitored within a paging channel transmitted from the base station (e.g. refer to a technology disclosed in an international publication number WO93/18596). While not performing the monitoring, the mobile station saves power consumption by bringing unnecessary circuits thereof to a low power consumption mode.

A paging channel is used in transmission of control information, call information, and the like, from a base station to a mobile station. The paging channel is divided into slots each having 80 ms. Each slot is called a paging channel slot, and the base station transmits a message to a particular mobile station at a particular cycle of paging channel slots (this cycle is called "slot cycle"). In this structure, the mobile station is able to monitor the paging channel slots directed to itself according to the slot cycle.

Currently, there are many use patterns of a mobile terminal (i.e. mobile station), and it is no longer necessary to monitor the paging channel always at a certain cycle in the standby state. Rather, it has become desirable to attempt power consumption saving by changing the monitoring cycle according to the current use pattern of the mobile terminal.

DISCLOSURE OF THE INVENTION

In view of the above-stated problem, the present invention aims to provide a mobile station that a user is able to use with hardly any inconvenience, and that is able to realize power consumption saving.

Through observation of use patterns of a mobile telephone, it is revealed that each user has his own periodicity, i.e. he tends to intensively use his mobile telephone in certain time periods or in certain days. Therefore, by referring to the past use patterns, it is considered possible to estimate when the user would use the mobile phone.

In view of this, a mobile station of the present invention includes: a history recording unit operable to record a speech-communication history including information identifying a time at which speech communication occurred; a decision unit operable to decide a cycle changing time and a cycle-after-change based on the speech-communication history, the cycle changing time being a time at which a paging channel monitoring cycle used by a base station in message transmission is to be changed, and the cycle-after-change being a cycle at which the paging channel is to be monitored after the change; a notification unit operable to notify the base station of a slot cycle index indicating the decided cycle-after-change when the decided cycle changing time has come; and a monitor unit operable to start monitoring the paging channel at the decided cycle-after-change when the decided cycle changing time has come.

With the stated construction, the mobile station is able to decide, by referring to the use history, a cycle at which the paging channel is to be monitored. Therefore the user is able to use the mobile station with hardly any inconvenience. At the same time, power consumption saving is realized.

To be more specific, in a standby state expected to have occurrence of speech communication, the paging channel is monitored at a shorter cycle. Whereas in a standby state not expected to have occurrence of speech communication, the paging channel is monitored at a longer cycle. The presence of the state in which a longer cycle is adopted leads to power saving on the whole.

The mobile station may further include a detection unit operable to detect an occurrence of speech communication, where the history recording unit records the speech-communication history in response to the detection performed by the detection unit.

With the stated construction, the mobile station of the user is able to record the use history, and so does not require importing of the use history or the like from outside. Consequently, the user is able to use the mobile station without inconvenience. At the same time, power consumption saving is realized.

The mobile station may further have a structure in which the speech-communication history includes, for each of time periods: occurrence/non-occurrence of speech communication; and a number of times of speech communication occurrence if a corresponding time period has occurrence of speech communication, the time periods being obtained by dividing one day into periods each having a predetermined time length, and the decision unit makes the decision so that a) the cycle changing time is decided to be a starting time of a time period subsequent to a time period including a current time, and b) for a time period in which a corresponding number of times of speech communication occurrence is larger than a predetermined number, a decided cycle-after-change is shorter both than a cycle-after-change for a time period in which a number of times of speech communication occurrence is the predetermined number or smaller, and than a cycle-after-change for a time period in which no speech communication has occurred.

With the stated construction, the cycle at which the paging channel is to be monitored within a time period is decided by referring to the number of times of speech communication occurrence in the time period within the use history. Consequently, the user is able to use the mobile station without inconvenience. At the same time, power consumption saving is realized.

The mobile station may further include a predetermined-cycle notification unit operable to notify, at an ending of speech communication, the base station of a slot cycle index indicating a predetermined cycle at which the paging channel is to be monitored; and a longer-cycle notification unit operable to notify the base station of a slot cycle index indicating a longer cycle than the predetermined cycle, when a certain time has passed after the ending of the speech communication.

With the stated construction, even after performing speech communication, the paging channel continues to be monitored at the cycle adequate for speech communication for a certain time period. Therefore, the user is able to use the mobile station without inconvenience. At the same time, power consumption saving is realized.

With respect to the mobile station, the time at which the speech communication occurred may correspond to a time at which either transmission or reception of an audio packet in Push To Talk (PTT) mode is performed.

With the stated construction, even in the PTT mode, the user is able to use the mobile station without inconvenience, and power saving is realized at the same time.

Another mobile station of the present invention includes: a history recording unit operable to record a speech-communication history including information identifying a time at which speech communication occurred; a decision unit operable to decide a cycle changing time and a cycle-after-change based on the speech-communication history, the cycle changing time being a time at which a paging channel monitoring cycle used by a base station in message transmission is to be changed, and the cycle-after-change being a cycle at which the paging channel is to be monitored after the change; a notification unit operable to notify the base station of the decided cycle changing time and a slot cycle index indicating the decided cycle-after-change; and a monitor unit operable to start monitoring the paging channel at the decided cycle-after-change when the decided cycle changing time has come.

With the stated construction, the base station will be, in advance, notified of the monitoring cycle of the paging channel, which has been decided according to the use history. Therefore, it becomes unnecessary to notify the base station each time the monitoring cycle has to be changed. In addition, the user is able to use the mobile station with hardly any inconvenience. At the same time, the power saving is realized.

BEST MODE FOR CARRYING OUT THE INVENTION

<Overview>

A mobile station relating to the present invention is equipped with a PTT (Push To Talk) function.

The PTT function is to send a speech sound to a party at another mobile station pre-registered only by pushing a PTT button instead of dialing, and in turn, to receive a speech sound sent from the party without any particular operation.

For starting such speech communication, a user enters the PTT mode by performing a certain operation as an indication for a PTT function start.

When this PTT function is performed, a slot cycle is set shorter than in normal cases so as to obtain another party's speech sound swiftly, for it is better to receive speech sounds of another user as swiftly as possible so as not to intermit conversation between the users.

In more detail, while in the PTT mode, a base station sends to a mobile station over a paging channel, a notification that a party at the other end emitted sound, and the mobile station is monitoring the paging channel at a shorter cycle than in normal cases, so as to detect the emission of sound from the party as early as possible.

Therefore, the power consumption becomes accordingly larger during the PTT mode than in the normal standby state.

In the normal standby state which is not in the PTT mode, the monitoring cycle of the paging channel is set to "slot cycle index 2"; while in the PTT mode, it is set to "slot cycle index 0" so as to facilitate smooth conversation between users.

Here, the slot cycle index is used to specify a transmission cycle of paging channel slots that are sent from a base station to a particular mobile station and in which information directed from the base station to the particular mobile station is stored. The cycle is calculated using the following expression:

$$80 \text{ ms} \times 16 \times 2^n$$

In this expression, "n" indicates a slot cycle index, and "$16 \times 2^n$" indicates a length of a slot cycle.

When the slot cycle index is "0", the transmission is performed at a cycle of 1.28 seconds, and when the slot cycle index is "1", the transmission is performed at a cycle of 2.56 seconds. Furthermore, when the slot cycle index is "2", the transmission is performed at a cycle of 5.12 seconds.

The monitoring cycle of 1.28 seconds in the case of the slot cycle index "0" is one third of the monitoring cycle of 5.12 seconds in the case of the slot cycle index "2". Therefore the power consumption in the PTT mode will be three times the power consumption in the normal standby state.

In the present invention, a conversation history during the PTT mode is stored inside the mobile station, for the purpose of setting the slot cycle index of "0" to a time period during which speech communication is expected to be performed. For other time periods, the slot cycle index of "2" is set so as to restrain the power consumption.

<Structure>

As follows, a mobile station relating to an embodiment of the present invention is described with reference to FIG. 1.

Figure 1:
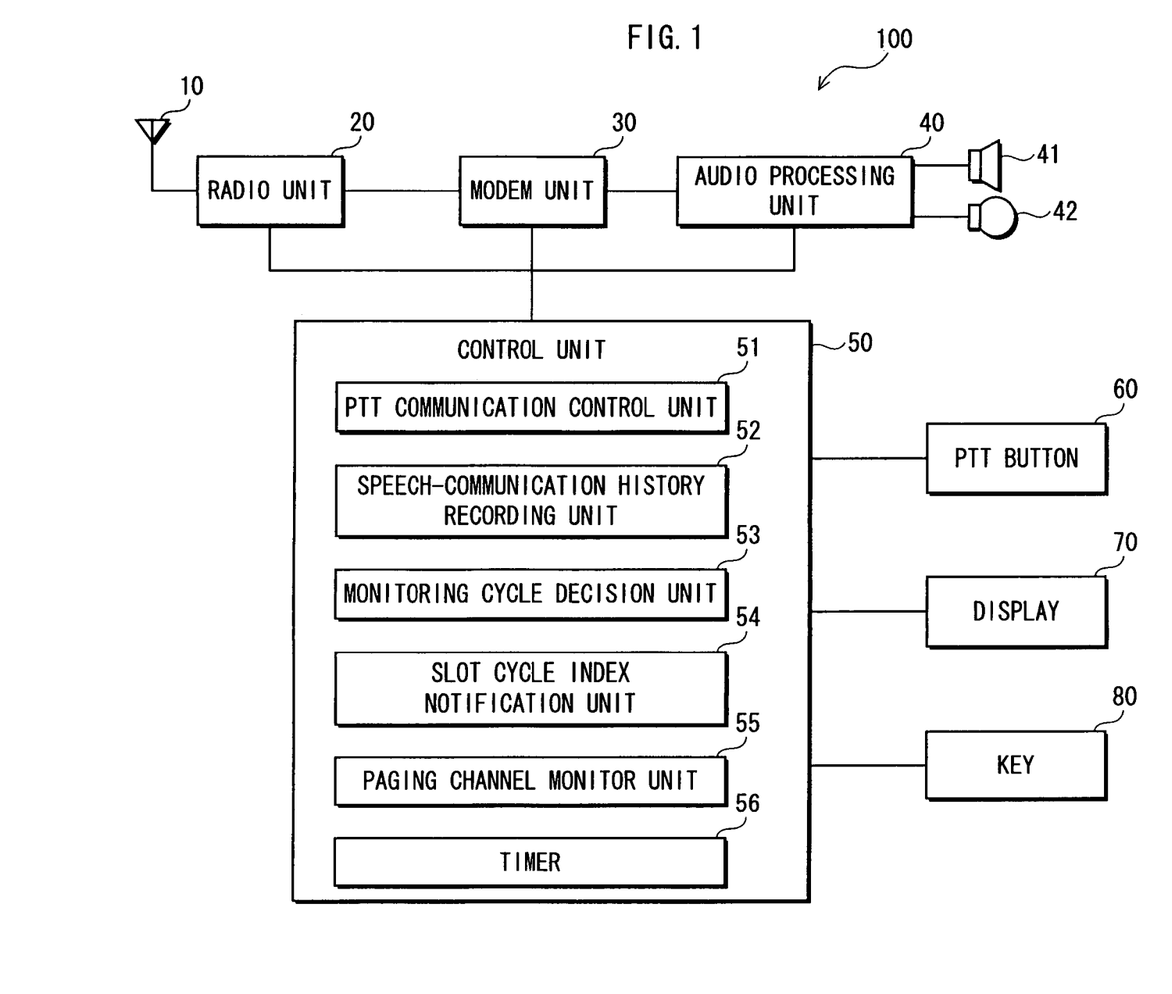
FIG. 1 is a functional block diagram showing a structure of a mobile station adopting a CDMA method.

FIG. 1 is a functional block diagram showing a structure of a mobile station adopting a CDMA method.

A mobile station 100 includes an antenna 10, a radio unit 20 equipped with a high frequency circuit, a modem unit 30 equipped with a modem circuit and a signal processing circuit, an audio processing unit 40 performing digital/analogue conversion of audio signals, a speaker 41 outputting audio signals, a microphone 42 from which external sounds are inputted, a control unit 50, a PTT button 60, a display 70, and a key 80.

The PTT button 60 has a button protruding from the case of the mobile station 100, and a structure of detecting push/release of the button and transmitting the detected event to the control unit 50.

The control unit 50 has a CPU, a memory, and the like (not shown in the drawings). In addition to general control processing (e.g. communication control) necessary for a portable telephone, the control unit 50 performs processing relating to the PTT function, which is unique to the present invention.

So as to realize the processing unique to the present invention, the control unit 50 has the following units: a PTT communication control unit 51, a speech-communication history recording unit 52, a monitoring cycle decision unit 53, a slot cycle index notification unit 54, a paging channel monitor unit 55, and a timer 56.

In addition to normal PTT communication processing, the PTT communication control unit 51 performs control processing relating to the PTT function, which is unique to the present invention. An example of the mentioned control processing is to detect an event of speech communication, and to record the event as a speech-communication history. The PTT communication control unit 51 is activated in response to entering of the mobile station 100 into the PTT mode, and is stopped in response to termination of the PTT mode.

The speech-communication history recording unit 52 records a speech-communication history of a user recorded during the PTT mode. In addition, the speech-communication history recording unit 52 performs such functions as updating and reading to the speech-communication history. The stored speech-communication history is such that the speech-communication number of times is counted for each time period, where the time period is obtained by dividing one day by every three hour. The speech-communication history is detailed later with reference to FIG. 2.

The mobile station 100 of the present invention attempts to change the slot cycle index for each three hour time period according to the speech-communication history of the time period.

The speech-communication history recording unit 52 receives an update instruction of the speech-communication history from the PTT communication control unit 51, and receives a reading instruction of the speech-communication history from the monitoring cycle decision unit 53.

The monitoring cycle decision unit 53 decides a monitoring cycle for a paging channel based on the speech-communication history stored in the speech-communication history recording unit 52. In addition, the monitoring cycle decision unit 53 sets the timer 56 so as to perform interruption for reminding the time to set the next monitoring cycle. Specifically, the timer is set at the beginning of the next time period.

Specifically, the monitoring cycle decision unit 53 decides a monitoring cycle for each three hour, by referring to the speech-communication history, where each three hour is a unit used in storing the speech-communication history in the speech-communication history recording unit 52. Accordingly, the control is required to be passed to the monitoring cycle decision unit 53 in good time before the starting of the next time period, so that the monitoring cycle decision unit 53 can decide the monitoring cycle of the next time period. In view of this, the timer is set to realize interruption at the starting of the next time period so as to pass the control to the monitoring cycle decision unit 53.

For example, for deciding the monitoring cycle for the time period of 15:00 to 18:00, the timer is set to 15:00 so that an interruption is performed and the control is passed to the monitoring cycle decision unit 53 at 15:00. Here, the monitoring cycle is decided by referring to the speech-communication history of the time period of 15:00 to 18:00 of the preceding day. After this processing, for deciding the monitoring cycle for the time period of 18:00 to 21:00, the timer is set to 18:00 so that an interruption is performed and the control is passed to the monitoring cycle decision unit 53 at 18:00.

Furthermore, the monitoring cycle decision unit 53 instructs the slot cycle index notification unit 54 to ask the base station to register therein the decided monitoring cycle for the paging channel. The monitoring cycle decision unit 53 also instructs the paging channel monitor unit 55 to monitor the paging channel at the decided monitoring cycle.

The slot cycle index notification unit 54 notifies the base station of the monitoring cycle of the paging channel. Specifically, a parameter change register message in which the value of the slot cycle index is set to "0" or to "2" is sent to the base station.

The slot cycle index notification unit 54 will be instructed by the monitoring cycle decision unit 53 and the PTT communication control unit 51 to notify the slot cycle index to the base station. Specifically, the monitoring cycle decision unit 53 instructs the slot cycle index notification unit 54 to notify the base station of the slot cycle index of "0" or "2" of the decided monitoring cycle, whereas the PTT communication control unit 51 instructs the slot cycle index notification unit 54 to notify the base station of the slot cycle index "0" because of the starting of the PTT communication.

The paging channel monitor unit 55 monitors the paging channel transmitted from the base station. The monitoring cycle to be monitored by the paging channel monitor unit 55 is the same as the cycle notified by the slot cycle index notification unit 54 to the base station.

The paging channel monitor unit 55 will be instructed by the monitoring cycle decision unit 53 and the PTT communication control unit 51 to change the monitoring cycle. Specifically, the monitoring cycle decision unit 53 instructs the paging channel monitor unit 55 to change the current monitoring cycle to the cycle indicated by the slot cycle index "0" or "2" that has been lately decided, whereas the PTT communication control unit 51 instructs the paging channel monitor unit 55 to monitor the paging channel at the cycle indicated by the slot cycle index "0" because of the starting of the PTT communication.

The timer 56 performs interruptions at the specified time. Specifically, when it reaches the specified time, the timer 56 passes the control to the PTT communication control unit 51, so that the PTT communication control unit 51 can in turn perform the processing corresponding to the interruption.

The timer 56 receives time setting from the monitoring cycle decision unit 53 and the PTT communication control unit 51. Specifically, the monitoring cycle decision unit 53 sets the timer for the starting time of the next time period. The PTT communication control unit 51 sets the timer for one hour after the ending of the PTT communication.

Here, the processing performed by the units in the PTT communication control unit 51 or the like is realized by execution of various programs performed by the CPU.

<Data>

As follows, main data used by the mobile station 100 is described with reference to FIG. 2.

Figure 2:
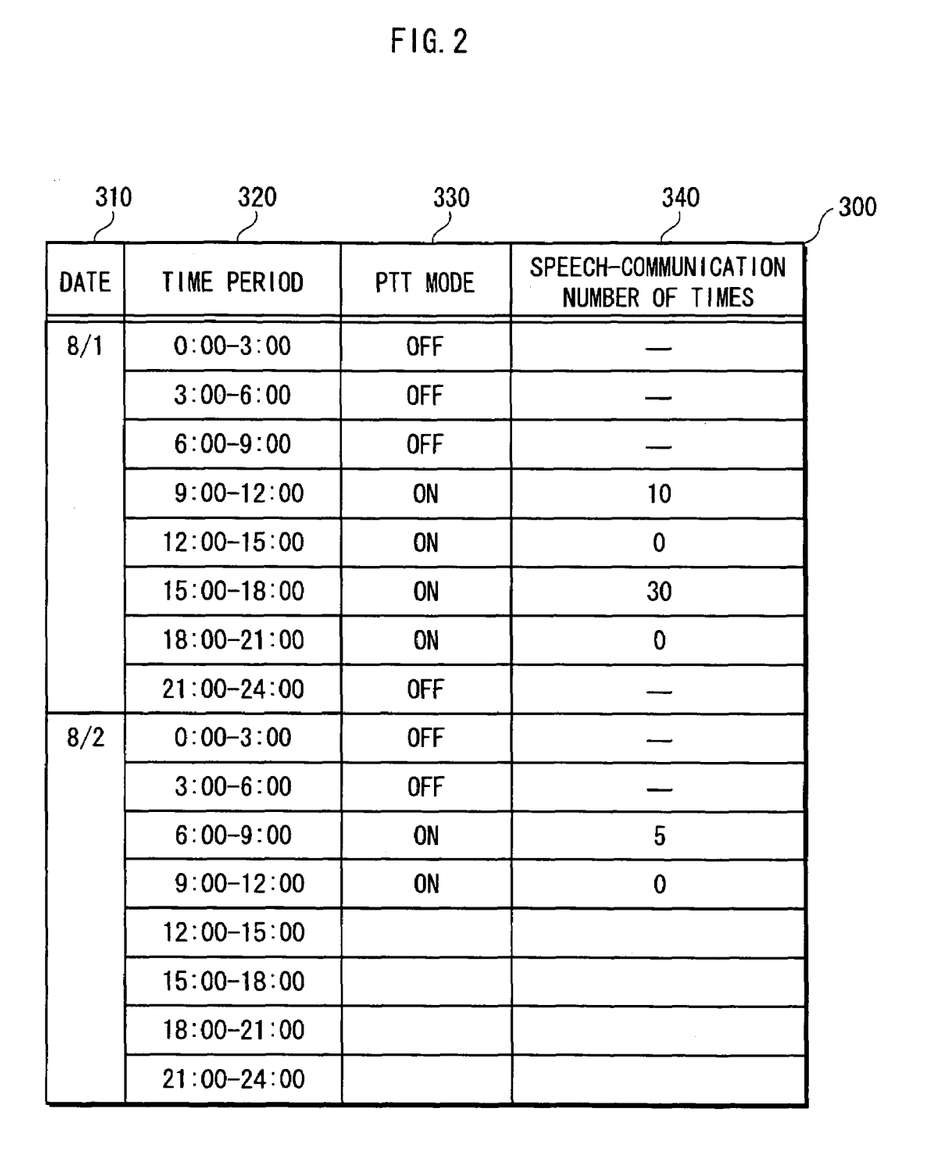
FIG. 2 shows one example of the contents of a speech-communication history.

FIG. 2 shows one example of the contents of the speech-communication history.

The speech-communication history 300 is made of a date 310, a time period 320, a PTT mode 330, and a speech-communication number of times 340.

The date 310 indicates a date on which the communication history is recorded.

The time period 320 indicates a time period on which the history is recorded. Specifically, one time period results by division of one day by every three hours.

The PTT mode 330 indicates whether the mobile station 100 has entered the PTT mode. When the mobile station 100 has entered the PTT mode, "ON" is indicated. Otherwise, "OFF" is indicated. Note that if there is at least a moment that the mobile station 100 is in the PTT mode within a corresponding time period 320, "ON" is indicated.

The speech-communication number of times 340 indicates a speech-communication number of times performed using the PTT function within a corresponding time period 320. For example, within the time period of 15:00 to 18:00 on August $1^{st}$, there is at least a moment that the mobile station 100 was in the PTT mode and performed 30 times of speech communication using the PTT function. When a PTT mode indicates "OFF", nothing is entered in the corresponding speech-communication number of times 340, which will not be referred to accordingly.

In this example, the speech-communication history 300 stored in the communication history recording unit 52 contains two days of data, namely a speech-communication history for yesterday, and a speech-communication history for today. To be more specific, the speech-communication history for yesterday is of August $1^{st}$, and the speech-communication history for today is of August $2^{nd}$. The current time is assumed to be 11:00, meaning that no history has been taken for 12:00 and thereafter.

In deciding the monitoring cycle, the monitoring cycle decision unit 53 refers to the speech-communication history of yesterday (i.e. of August $1^{st}$).

Note that when the time has reached 24:00 of August $2^{nd}$, the monitoring cycle decision unit 53 starts referring to the speech-communication history August $2^{nd}$.

<Operation>

As follows, the operation performed by the aforementioned mobile station 100 is described with reference to FIGS. 3-7.

Figure 3:
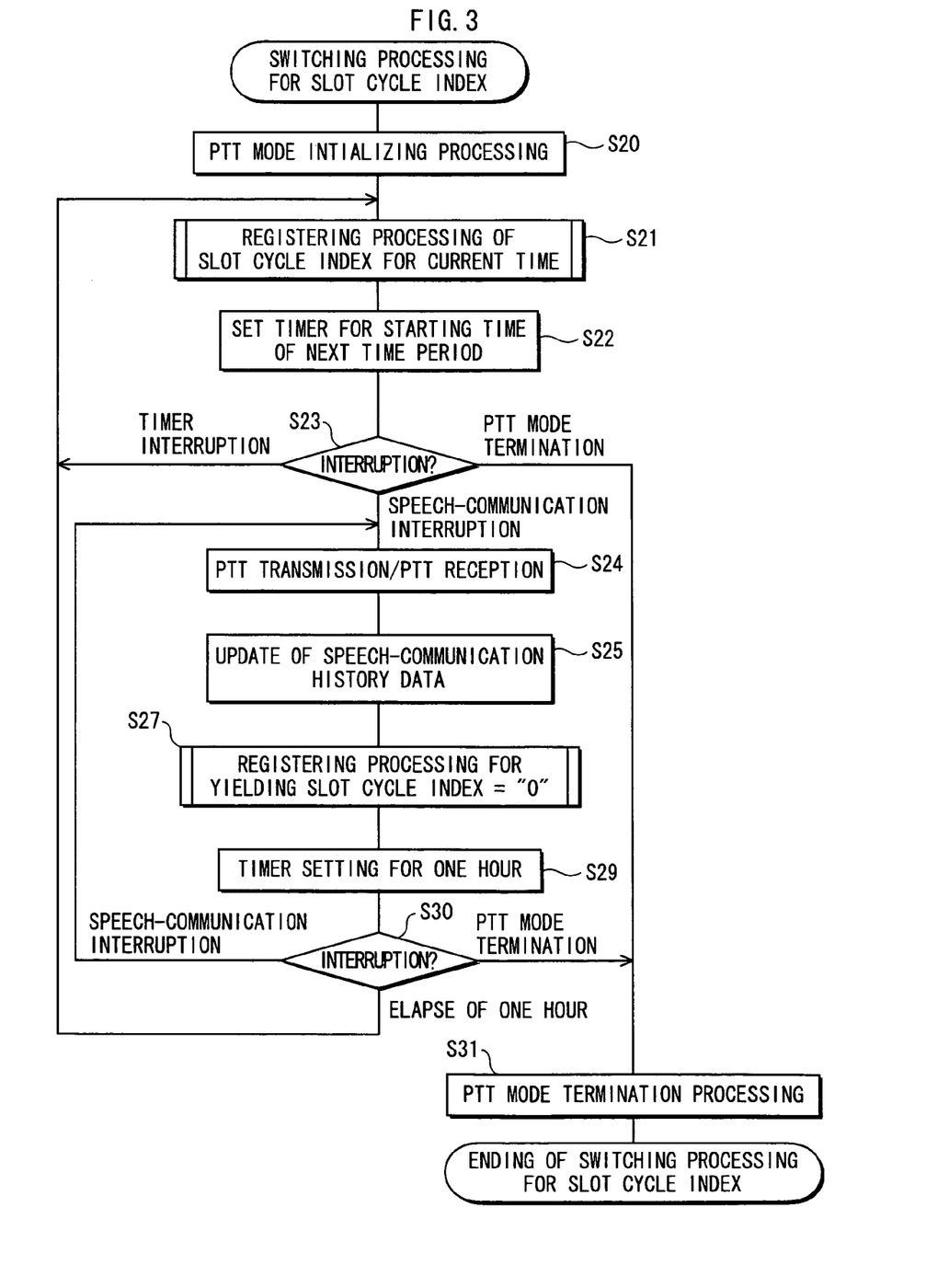
FIG. 3 is a flowchart showing switching processing for a slot cycle index.

FIG. 3 is a flowchart showing switching processing for the slot cycle index. This processing is always performed while the mobile station 100 is in the PTT mode.

First, the user selects, by operating the key 80, the PTT mode from the menu displayed on the display of the mobile station 100.

The control unit 50, after receiving the selection operation of the PTT mode, passes the control to the PTT communication control unit 51. The PTT communication control unit 51 performs PTT mode initializing processing (Step S20).

The PTT mode initializing processing is to sign in an IP network for PTT communication, to request assignment of an IP address from the network, and to obtain the IP address from the network. The network, having assigned an IP address to the mobile station 100, manages the assigned IP address with a mobile-station identifier of the mobile station 100, and performs such processing as transmission of an audio packet for speech communication directed to the IP address.

In addition, the PTT communication control unit 51 notifies the speech-communication history recording unit 52 of the current time and the fact that the mobile station 100 has entered the PTT mode. When receiving the notification, the speech-communication history recording unit 52 sets a PTT mode 330, which corresponds to the time period 320 that includes the notified time, to "ON", and sets the corresponding speech-communication number of times 340 to "0".

The PTT communication control unit 51, having performed the PTT mode initializing processing, then performs processing for registering the cycle index for the current time (Step S21).

Specifically, the PTT communication control unit 51 transfers the current time to the monitoring cycle decision unit 53, and instructs the monitoring cycle decision unit 53 to perform the processing for registering the cycle index for the current time obtained by referring to the time set in the mobile station. In the mobile station, the time has been adjusted to the time of the base station obtained during the initialization at the time of power-up of the mobile station.

The monitoring cycle decision unit 53, having received the instruction to perform the registering processing of the slot cycle index for the current time, selects a slot cycle index corresponding to the optimal monitoring cycle, by referring to the speech-communication history of the time period 320 in the previous day (see FIG. 2) in which the current time is included, so that the paging channel will be monitored at the optimal monitoring cycle. The monitoring processing is detailed later with reference to FIG. 4.

After deciding the optimal monitoring cycle for the current time at which the paging channel should be monitored, the monitoring cycle decision unit 53 sets the timer 56 for the time when it is required to review the slot cycle index next time, so as to realize interruption (Step S22).

Here, the time when it is required to review the slot cycle index next time corresponds to the starting time of the next time period, which immediately succeeds the time period 320 that includes the current time. In the example of FIG. 2, if the current time is 11:00, August $2^{nd}$, then the starting time of the next time period corresponds to 12:00.

After setting the timer, the monitoring cycle decision unit 53 returns the control to the PTT communication control unit 51. The PTT communication control unit 51, receiving the control, enters into a wait state.

When there is a timer interruption set by the monitoring cycle decision unit 53 (Step S23), the PTT communication control unit 51 performs registering processing of the cycle index for the current time (Step S21).

In addition, the PTT communication control unit 51 notifies the speech-communication history recording unit 52 of the current time and the fact that the mobile station 100 has entered the PTT mode. Upon reception of the notification, the speech-communication history recording unit 52 sets a PTT mode 330, which corresponds to the time period 320 that includes the notified time, to "ON", and sets the speech-communication number of times 340 to "0".

When there is an interruption due to a termination of the PTT mode (Step S23), the PTT communication control unit 51 performs PTT mode termination processing (Step S31), thereby ending the switching processing for the slot cycle index.

A user can terminate the PTT mode by operating the key 80 to select "PTT mode termination" from the menu displayed at the display of the mobile station 100. After detecting the PTT mode termination processing, the control unit 50 interrupts the PTT communication control unit 51 to notify of the event.

Having received the notification of the PTT mode termination, the PTT communication control unit 51 performs termination processing of the PTT mode, i.e. performs processing to release the IP address by signing out the IP network, thereby terminating the PTT mode.

When there is an interruption due to an occurrence of speech communication (Step S23), processing for the PTT communication (either transmission or reception) is performed (Step S24).

Transmission processing in PTT communication is performed by a user of the mobile station 100 by pushing the PTT button 60 thereby transmitting emitted sound to the party at the other end.

When the user pushes the PTT button 60, the control unit 50, detecting the push, interrupts the PTT communication control unit 51 (Step S23). The PTT communication control unit 51 issues a PTTCALL signal to the base station for requesting assignment of a traffic channel. The PTT communication control unit 51 transmits sound to the party at the other end. Prior to the transmission, the sound has undergone the processes of being inputted through the speaker 41, digitalized by the audio processing unit 40, and converted, by the modem unit 30, into the form of an audio packet having assigned the IP address of the party at the other end.

The user ends the transmission processing in PTT communication by releasing the PTT button 60 thereby releasing the traffic channel.

Reception processing in PTT communication means that a user of the mobile station 100 receives sound emitted from the party at the other end.

When the party at the other end performs transmission processing in PTT communication, the base station receives a PTTCALL signal issued from the mobile station of the party, and notifies the event to the mobile station 100 via the paging channel. When the mobile station 100 responds to this notification, a traffic channel is established. The mobile station 100 is able to receive the audio packet of the party via the traffic channel and then played back.

The reception processing in PTT communication will end when the party at the other end has released the PTT button 60 thereby releasing the traffic channel.

Having ended either transmission or reception in PTT communication, the PTT communication control unit 51 updates the speech-communication history data (Step S25).

Here, the PTT communication control unit 51 specifically instructs the speech-communication history recording unit 52 to update the speech-communication history, by informing it of the time at which the speech communication occurred as well as the occurrence of speech communication.

Upon reception of the request, the speech-communication history recording unit 52 counts the speech-communication number of times 340 for the time period 320 that includes the notified time. In the example of FIG. 2, if the speech communication occurred at 11:00 on August $2^{nd}$, then the speech-communication number of times 340 for the corresponding time period 320 "9:00-12:00" will be changed to "1" from "0" (See FIG. 2).

The PTT communication control unit 51, having finished update of the speech-communication history data, performs registration processing for yielding the slot cycle index="0" (Step S27). This registering processing aims to provide smooth conversation between users by making the monitoring cycle for paging channel shorter during the PTT speech communication. The registration processing is detailed later with reference to FIG. 5.

After having performed the registering processing for yielding the slot cycle index="0", the PTT communication control unit 51 sets the timer to perform interruption after one hour (Step S29). To be more specific, the current setting of the timer is cancelled, and reset to realize interruption when one hour has passed after the last speech communication.

This 1-hour timer setting aims to keep monitoring the paging channel at the shorter cycle with the slot cycle index "0" for the one hour after the ending of the speech communication, since the likelihood of the occurrence of speech communication is expected to be high for the period of one hour.

After setting the timer, the PTT communication control unit 51 enters into a wait state.

When there is an interruption due to an occurrence of speech communication (Step S30), processing for transmission/reception in PTT communication is performed (Step S24).

When there is an interruption due to a PTT mode termination (Step S23), PTT mode termination processing is performed (Step S31), thereby ending the switching processing for the slot cycle index.

When there is a timer interruption indicating that one hour has passed (Step S30), registering processing for the slot cycle index for the current time is performed (Step S21). In other words, when there is no further speech communication occurred during the one hour, the slot cycle index is returned to the original value when the one hour has passed.

This is explained as follows using the example of FIG. 2. Here, suppose that the time at which the one hour has passed corresponds to 13:00, August $2^{nd}$. Then the slot cycle index is changed to "2" from the current value of "0", because the time period 320 of 12:00 to 15:00 that includes 13:00 of the previous day (August $1^{st}$) has a speech-communication number of times 340 of "0".

Figure 4:
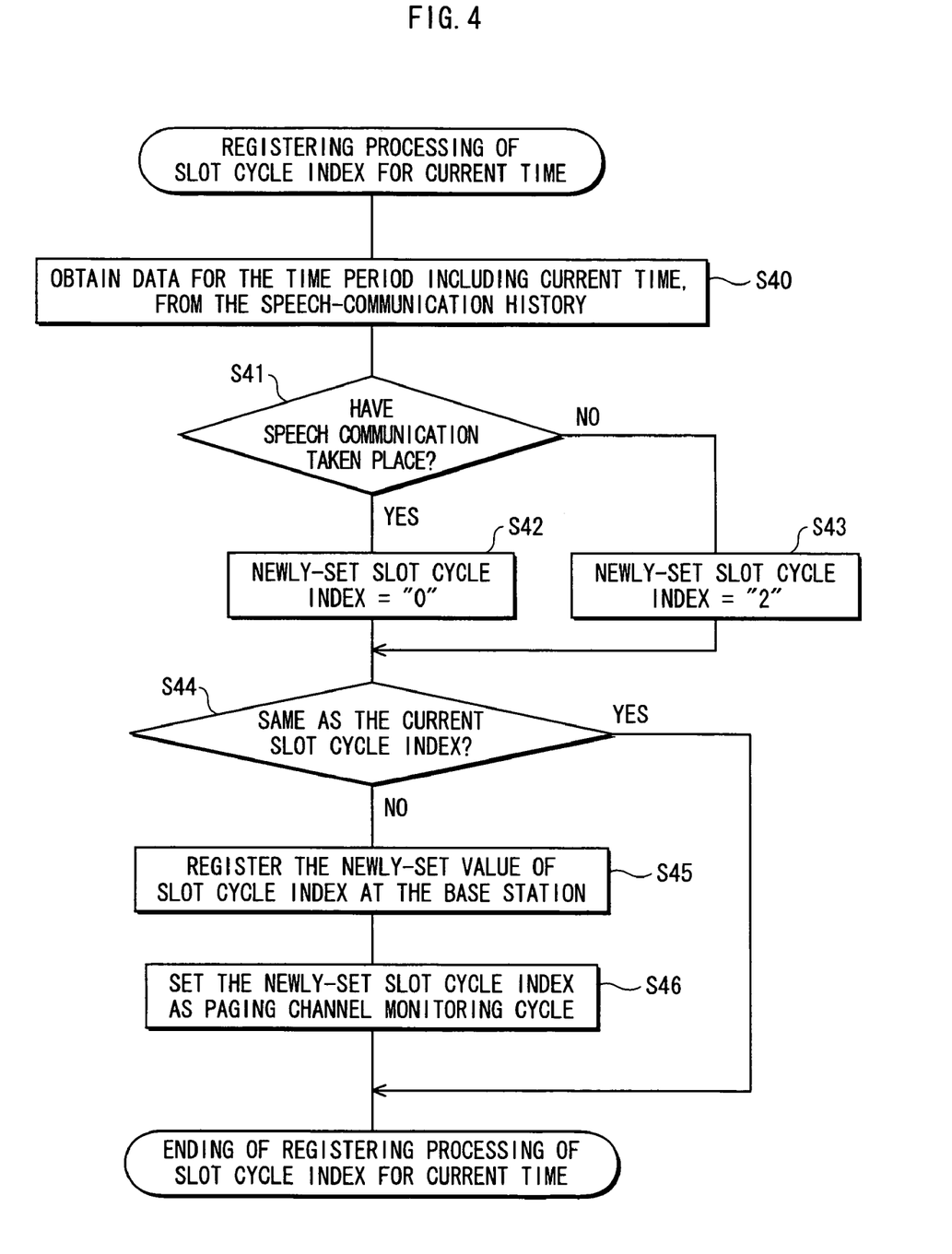
FIG. 4 is a flowchart showing registering processing of the slot cycle index for the current time.

Next, the registering processing of the slot cycle index for the current time is explained using an example of FIG. 4.

FIG. 4 is a flowchart showing the registering processing of the slot cycle index for the current time.

The registering processing is performed by the monitoring cycle decision unit 53, when the unit 53 has received, from the PTT communication control unit 51, a current time and an instruction to perform the registering processing of the slot cycle index for the current time.

The monitoring cycle decision unit 53, having received the instruction, obtains communication data for the time period 320 that includes the received current time (Step S40). Specifically, the monitoring cycle decision unit 53 instructs the speech-communication history recording unit 52 to read the data by specifying the time.

The speech-communication history recording unit 52, having received the instruction to read the data, reads, from the speech-communication history for yesterday (i.e. the speech-communication history for August $1^{st}$), the data corresponding to the corresponding time period, and passes the data to the monitoring cycle decision unit 53.

Having received the data involving the specified time from the speech-communication history recording unit 52, the monitoring cycle decision unit 53 judges whether speech communication occurred in the time period in the data (Step S41).

The judgment of Step S41 results in the affirmative if the PTT mode 330 indicates "ON", and that the speech-communication number of times 340 indicates "1" or a greater number. On the other hand, the judgment of Step S41 results in the negative if the PTT mode 330 indicates "OFF" or if the speech-communication number of times 340 indicates "0" even though the PTT mode 330 indicates "ON".

When the judgment of Step S41 has resulted in the affirmative, the slot cycle index is newly set to "0" (Step S42). On the other hand, when the judgment of Step S41 has resulted in the negative, the slot cycle index is newly set to "2" (Step S43).

Next, thus newly-set slot cycle index is compared with the current slot cycle index (Step S44) to see if they are identical. If they are judged to be identical, the registering processing will be ended without any performance.

When the newly-set slot cycle index is judged to be different from the current slot cycle index, the slot cycle index notification unit 54 will be instructed to register the value of the newly-set slot cycle index at the base station (Step S45).

The slot cycle index notification unit 54, having received the instruction, transmits, to the base station, a parameter change register message indicating to change the slot cycle index. The detail of the processing of the parameter change registration is described later with reference to FIGS. 6 and 7.

Following this, the monitoring cycle decision unit 53 instructs the paging channel monitor unit 55 to monitor the paging channel at the cycle specified by the newly-set slot cycle index (Step S46).

The paging channel monitor unit 55, having received the instruction, monitors the paging channel at the cycle specified by the newly-set slot cycle index.

Next, the registering processing for yielding the slot cycle index="0" is described with reference to FIG. 5.

Figure 5:
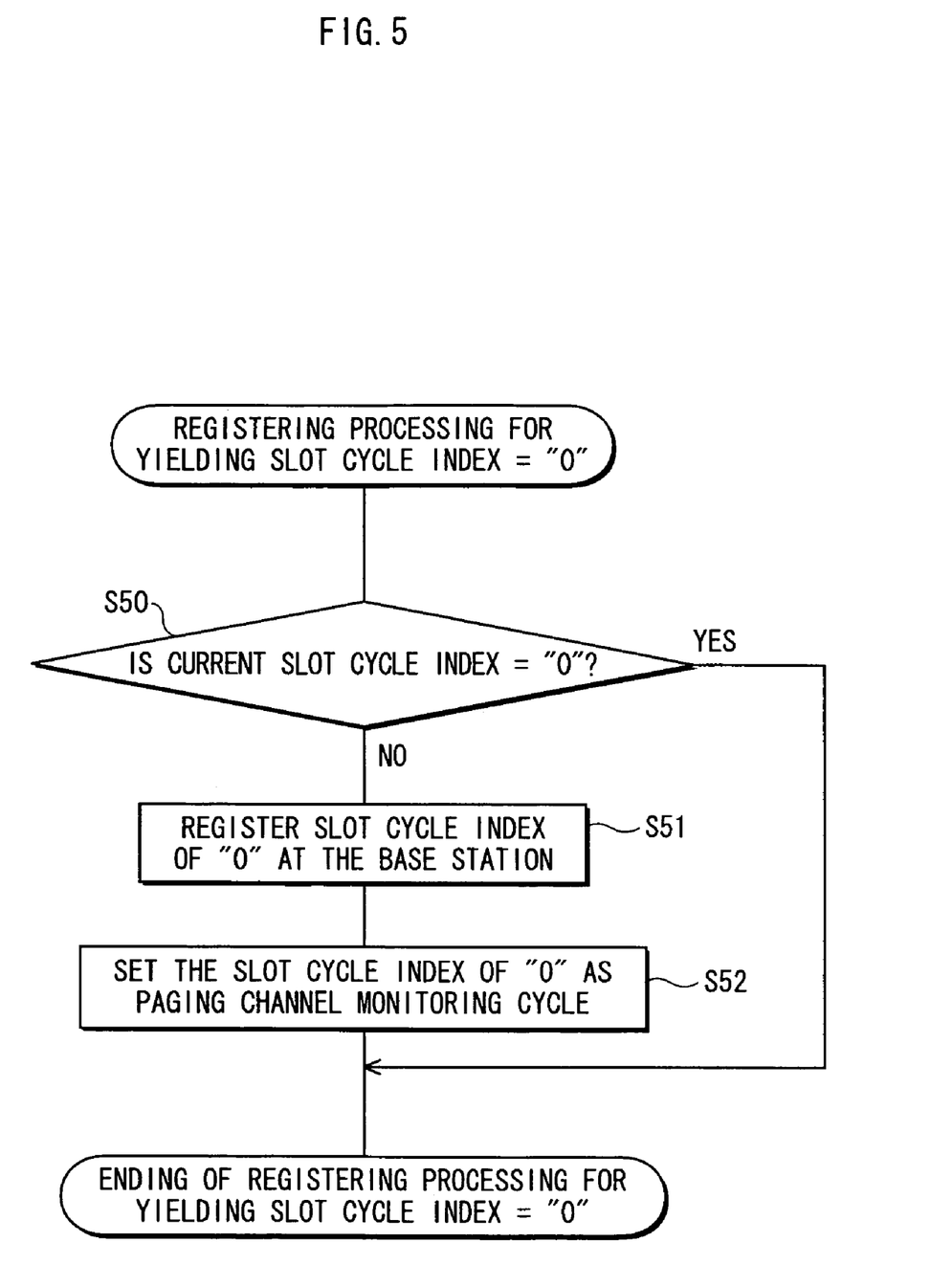
FIG. 5 is a flowchart showing registering processing for yielding the slot cycle index="0".

FIG. 5 is a flowchart showing the registering processing for yielding the slot cycle index="0".

Judgment is performed as to whether the current slot cycle index indicates the value of "0" (Step S50). When the judgment results in the affirmative, the registering processing is ended without any performance.

When the judgment of Step S50 results in the negative, the slot cycle index notification unit 54 is instructed to register the slot cycle index="0" at the base station (Step S51).

After this, the paging channel monitor unit 55 is informed that the mobile station 100 will monitor the paging channel at the cycle indicated by the slot cycle index="0" (Step S52).

Figure 6:
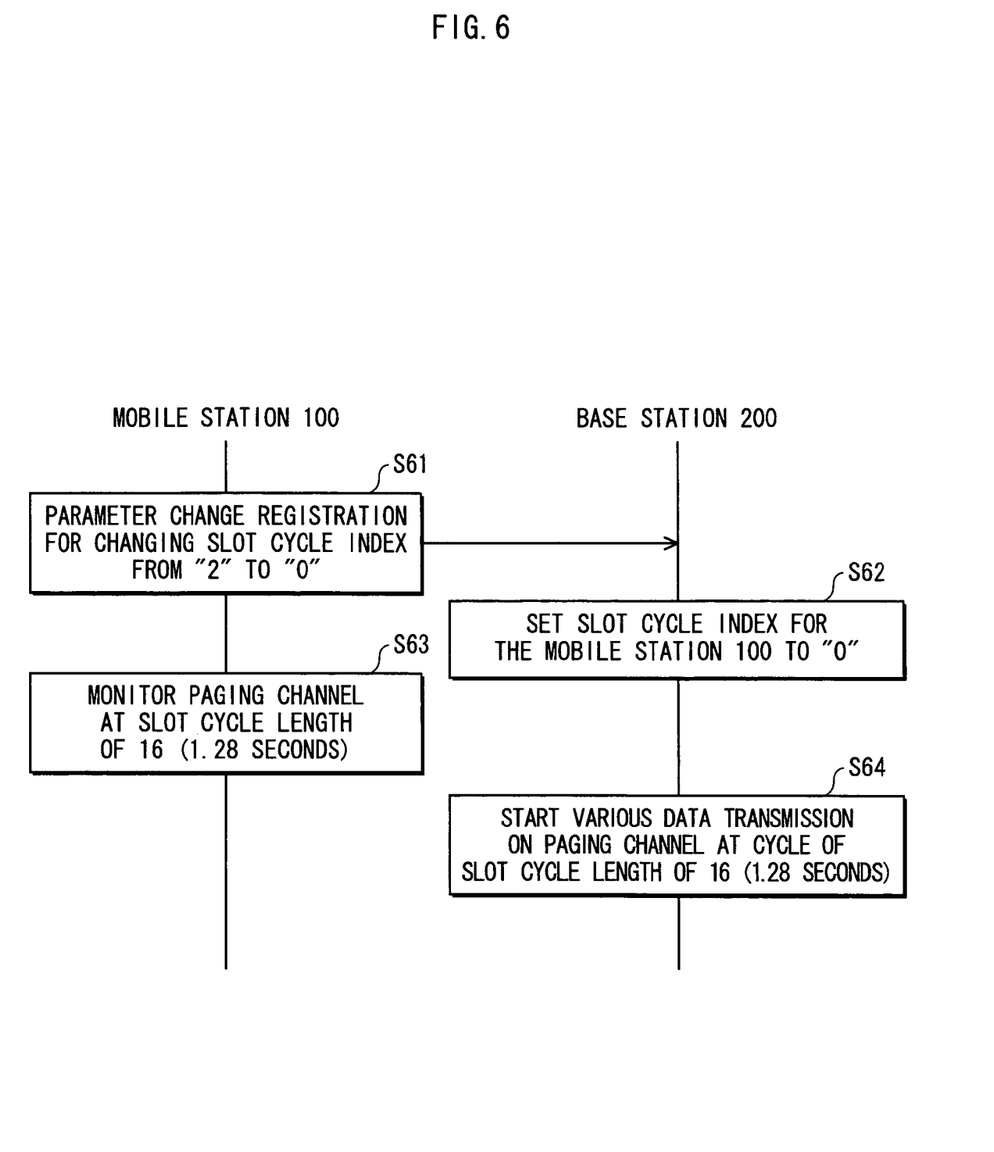
FIG. 6 is a diagram showing, in detail, processing to change the slot cycle index to "0" from "2".
Figure 7:
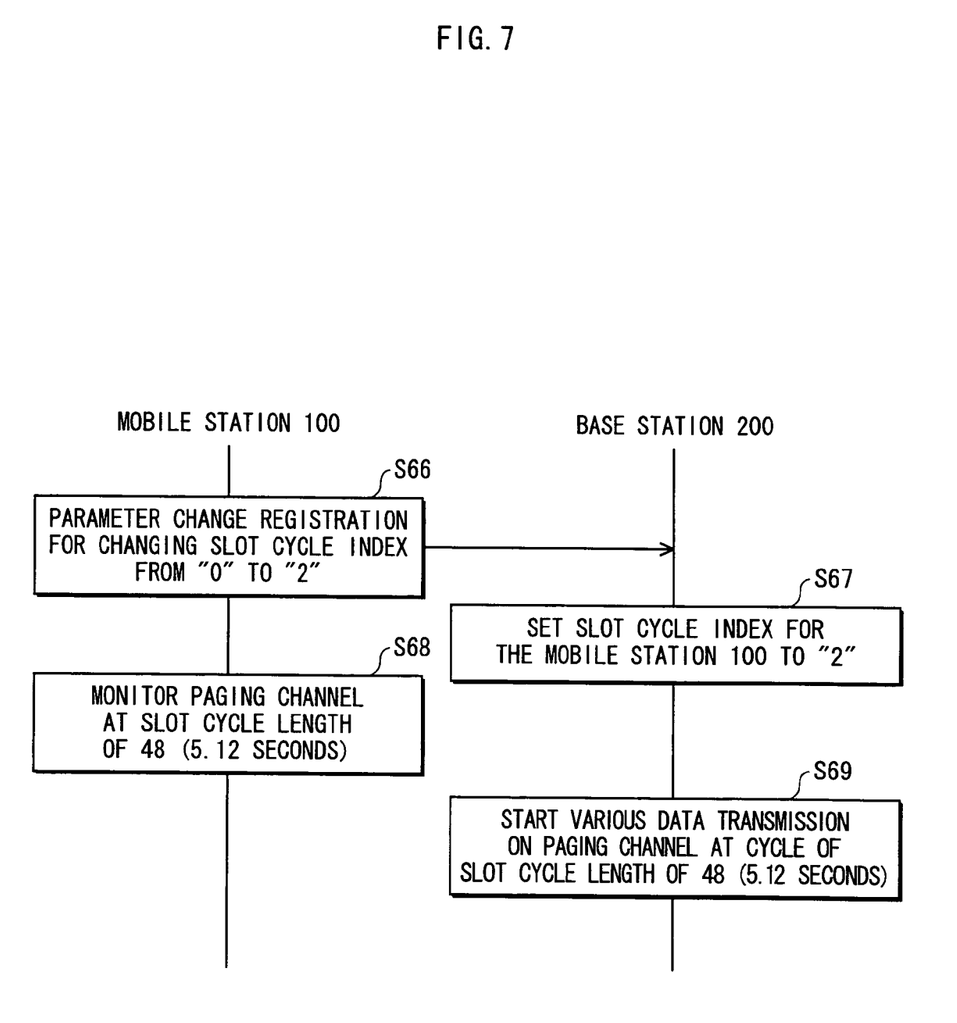
FIG. 7 is a diagram showing, in detail, processing to change the slot cycle index to "2" from "0".

FIGS. 6 and 7 are diagrams showing the details the parameter change registration processing.

FIG. 6 shows processing to change the slot cycle index to "0" from "2", and FIG. 7 shows processing to change the slot cycle index to "2" from "0".

First, FIG. 6 is explained.

A parameter change register message, in which the value of the slot cycle index is set to "0", is transmitted to the base station 200 (Step S61). The base station 200, having received the message, stores a mobile-station identifier of the mobile station 100 in association with the value "0" of the slot cycle index (Step S62). After this, the base station 200 will transmit various types of messages over the paging channel to the mobile station 100 at a slot cycle length of 16 (1.28 seconds) (Step S64). The mobile station 100 will also start monitoring the paging channel at the same slot cycle length (Step S63).

Next, FIG. 7 is explained.

The operation performed in FIG. 7 is the same as the operation performed in FIG. 6. Specifically, a parameter change register message, in which the slot cycle index is set to "2", is transmitted to the base station 200 (Step S66) The base station 200, having received the message, stores the mobile station identifier of the mobile station 100 in association with the value "2" of the slot cycle index (Step S67) After this, the base station 200 will transmit various types of messages over the paging channel to the mobile station 100 at a slot cycle length of 48 (5.12 seconds) (Step S69). The mobile station 100 will also start monitoring the paging channel at the same slot cycle length (Step S68).

<Other Notes>

So far, the mobile station relating to the present invention has been described by way of an embodiment. However, it is possible to partially modify the stated mobile station, and it is needless to say that the present invention should not be limited to the above-stated embodiment. For example, the following modifications are possible:

(1) In the embodiment, the speech-communication history only includes the data for yesterday. However, the speech-communication history may relate to data for the latest day on which the mobile station was used. Alternatively, the speech-communication history may relate to data for a plurality of days, a plurality of months, and so forth.

Furthermore, in the embodiment, the slot cycle index is judged to be "0" when the speech-communication number of times for the same time period in the data for yesterday is at least 1. However, the judgment may be performed by other judgment criteria.

Performing the judgment using other judgment criteria expands the potential for selection of an optimal day as the speech-communication history depending on the use pattern of the mobile station, and so has a possibility of further restraining power consumption.

For example, suppose a case where a user uses a mobile station for both of private and official purposes. In such a case, as a speech-communication history as a reference for Monday (i.e. the first weekday of a week), it appears suitable to use data for Friday (i.e. the last weekday of the previous week). There may also be a case where it is suitable to use data for the same day of a week as a speech-communication history as a reference for the same day of the following week. Likewise, there may be a case where it is suitable to use data for the same day in a month as a speech-communication history as a reference for the same day in the following month.

It is alternatively possible to decide the value of the slot cycle index by using the average value of speech-communication history data for several days, instead of speech-communication history data for only one day.

It is also possible to decide the value of the slot cycle index by predicting the future occurrence of speech communication, by taking into account such trends as the increase rate of the number of times of speech communication for the last several days and the change in the number of times of speech communication for the last several hours. It is also possible to design to change the value of the slot cycle index when a predetermined party has initiated speech communication.

(2) In the embodiment, the speech-communication number of times is summed for every three hours. However, other methods are also feasible relating to the summation.

For example, a method is possible in which the summation is performed for every two hours during the daytime, while performing the summation for every five hours during the night. Alternatively, the summation method may be changed every day, or every month. In addition, the speech-communication history may include the party at the other end of the speech communication.

The above-stated method expands the potential for selection of an optimal time period or an optimal speech communication session as the speech-communication history depending on the use pattern of the mobile station, and so has a possibility of further restraining power consumption.

(3) In the embodiment, the value of the slot cycle index is set either to "0" or to "2", but is not limited to such, as long as the value is set so as to yield a shorter slot cycle length for the time period expected to have an occurrence of PTT speech communication than for the other time periods.

(4) In the embodiment, during the normal standby mode, processing for PTT mode communication is not accepted at all, while during the PTT mode, processing for communication accepted in the normal standby mode communication is not accepted at all. However, another structure is also possible in which both of the PTT mode and the normal standby mode are available in a same time period.

(5) In the embodiment, the slot cycle is determined automatically. However, it is also possible to allow users to select and specify the slot cycle. This is realized for example by a structure in which the control unit 50 presents a list of slot cycle alternatives on the display 70 in response to a predetermined operation performed by a user either during the normal stand-by mode or during the PTT mode. Receiving an operation for selecting one of the alternatives from the user, the control unit 50 instructs the slot cycle index notification unit 54 to perform a parameter change registration directed to the base station 200, where the parameter change registration indicates the slot cycle index corresponding to the selected alternative. The control unit 50 also instructs the paging channel monitor unit 55 to monitor the paging channel at the cycle specified by the slot cycle index corresponding to the selected alternative.

According to the above-stated structure, the user is able to select a slot cycle in accordance with the intended objective such as power reduction and response speed improvement in the PTT communication.

(6) In the embodiment, the timer for an hour is reset after each session of speech communication. However, the present invention is not limited to such a structure. For example, the timer for an hour may be reset when a session of speech communication did not exceed 30 seconds.

(7) In the embodiment, the time of the base station, to which the time of the mobile station is to be adjusted and on which the current time is based, is obtained at the time of power-up of the mobile station. However not limited to such a structure, the mobile station may obtain the time of the base station whenever necessary.

(8) It is possible to record in a recording medium, or distribute via various communication paths, a program for making the CPU execute each piece of control processing for realizing each function of the mobile station explained in the embodiment (please refer to FIG. 1). Examples of the recording medium are: an IC card, an optical disk, a flexible disk, a ROM, and a flash memory. The distributed program is utilized by being stored in a CPU-readable memory or the like within the apparatus. Each function of the mobile station shown in the embodiment is realized executing of the program performed by the CPU.

(9) In the embodiment, the slot cycle index in the standby state in the PTT mode is changed in accordance with the speech-communication history for the PTT mode. However it is also possible to create a speech-communication history involving other modes than the PTT mode, and to use such speech-communication history in changing the slot cycle index in the other modes.

(10) The embodiment intends to shorten the monitoring cycle of the paging channel in the PTT mode compared to the monitoring cycle of the paging channel in the normal standby state. However, the present invention is also able to be used to lengthen the monitoring cycle of the paging channel compared to the monitoring cycle of the paging channel in the normal standby state, according to the circumstances.

For example, during the time period where only mail reception is expected, it is considered better to restrain power consumption by increasing the length of the monitoring cycle of the paging channel.

(11) In the embodiment, the monitoring cycle decision unit 53 decides the monitoring cycle of the paging channel at the starting of the time period of the speech-communication history. However, the decision may be performed at other timings as long as it is prior to the starting time.

For example, the control may reach the monitoring cycle decision unit 53 five minutes before the starting time of the time period of the speech-communication history.

Alternatively, the decision maybe performed well in advance. For example, the monitoring cycle for each time period of the day may be determined referring to the history of the previous day when the control is passed to the monitoring cycle decision unit 53 at 0:00 midnight. In this case, upon reception of the control after 0:00 midnight, the monitoring cycle decision unit 53 only has to return the monitoring cycle determined in advance.

Furthermore, the monitoring cycle decision unit 53 is designed to perform the decision of the monitoring cycle of the paging channel at the starting of the time period to change the monitoring cycle. In view of this structure, an instruction to change the monitoring cycle is given to the base station immediately after the decision of the monitoring cycle. However, it is alternatively possible to give the change instruction to the base station prior to the starting time.

In this case, it is necessary to notify the base station of the time at which the monitoring at the monitoring cycle should begin as well as the monitoring cycle, so that the base station be able to start the monitoring at the notified monitoring cycle from the notified time.

INDUSTRIAL APPLICABILITY

The present invention is applicable as a technique for a mobile telephone equipped with a PTT function.

The invention claimed is:

1. A mobile station comprising:
a decision unit operable to decide a cycle changing time and a cycle-after-change, the cycle changing time being a time at which a paging channel monitoring cycle used by a base station in message transmission is to be changed, and the cycle-after-change being a cycle at which the paging channel is to be monitored after the change;
a notification unit operable to notify the base station of a slot cycle index indicating the decided cycle-after-change when the decided cycle changing time has come; and
a monitor unit operable to start monitoring the paging channel at the decided cycle-after-change when the decided cycle changing time has come, wherein
the decision unit makes the decision at an ending of speech communication so that a) the cycle changing time is decided to be a predetermined time after the ending of the speech communication and b) the decided cycle-after-change is longer than a cycle at which the paging channel is monitored during the predetermined time.

2. The mobile station of claim 1, wherein
the ending of speech communication corresponds to a time at which either transmission or reception of an audio packet in PTT mode is performed.

3. The mobile station of claim 1, further comprising
a history recording unit operable to record a speech-communication history including information identifying a time at which speech communication occurred, wherein
the decision unit decides the cycle changing time and the cycle-after-change by referring to the speech-communication history.

4. The mobile station of claim 3, further comprising
a detection unit operable to detect an occurrence of speech communication, wherein
the history recording unit records the speech-communication history in response to the detection performed by the detection unit.

5. The mobile station of claim 3, wherein
the speech-communication history includes, for each of time periods: occurrence/non-occurrence of speech communication; and a number of times of speech communication occurrence if a corresponding time period has occurrence of speech communication, the time periods being obtained by dividing one day into periods each having a predetermined time length, and
the decision unit makes the decision so that a) the cycle changing time is decided to be a starting time of a time period subsequent to a time period including the predetermined time after the ending of the speech communication, and b) for a time period in which a corresponding number of times of speech communication occurrence is larger than a predetermined number, a decided cycle-after-change is shorter both than a cycle-after-change for a time period in which a number of times of speech communication occurrence is the predetermined number or smaller, and than a cycle-after-change for a time period in which no speech communication has occurred.

6. The mobile station of claim 3, wherein
the time at which the speech communication occurred corresponds to a time at which either transmission or reception of an audio packet in Push To Talk (PTT) mode is performed.

7. A mobile station comprising:
a decision unit operable to decide a cycle changing time and a cycle-after-change, the cycle changing time being a time at which a paging channel monitoring cycle used by a base station in message transmission is to be changed, and the cycle-after-change being a cycle at which the paging channel is to be monitored after the change;
a notification unit operable to notify the base station of the decided cycle changing time and a slot cycle index indicating the cycle-after-change; and
a monitor unit operable to start monitoring the paging channel at the decided cycle-after-change when the decided cycle changing time has come, wherein
the decision unit makes the decision at an ending of speech communication so that a) the cycle changing time is decided to be a predetermined time after the ending of the speech communication, and b) the decided cycle-after-change is longer than a cycle at which the paging channel is monitored during the predetermined time.

* * * * *